United States Patent [19]
Hori et al.

[11] Patent Number: 5,430,125
[45] Date of Patent: Jul. 4, 1995

[54] PROCESS FOR PRODUCING POLY(3-HYDROXYBUTYRIC ACID)

[75] Inventors: Yoji Hori, Kanagawa; Takao Nishishita, Tokyo; Akio Yamaguchi, Kanagawa, all of Japan

[73] Assignee: Takasago International Corporation, Tokyo, Japan

[21] Appl. No.: 202,131

[22] Filed: Feb. 25, 1994

[30] Foreign Application Priority Data

Feb. 26, 1993 [JP] Japan .................. 5-062919

[51] Int. Cl.$^6$ ............................................. C08G 63/08
[52] U.S. Cl. .................................. 528/354; 528/357; 528/361; 556/83
[58] Field of Search .................. 528/354, 357, 361; 556/83

[56] References Cited

U.S. PATENT DOCUMENTS

| | | | |
|---|---|---|---|
| 4,071,507 | 1/1978 | Schoen | 528/354 |
| 4,393,167 | 7/1983 | Holmes et al. | 525/450 |
| 5,191,037 | 3/1993 | Doi et al. | 525/450 |
| 5,278,256 | 1/1994 | Bellis | 525/450 |
| 5,281,691 | 1/1994 | Hubbs et al. | 528/361 |

FOREIGN PATENT DOCUMENTS 432927 2/1943 Japan .

OTHER PUBLICATIONS

Richard A. Gross, et al., *Macromolecules*, vol. 21, pp. 2657–2668 (Sep., 1988).
Y. Zhang, et al., *Macromolecules*, vol. 23, pp. 3206–3212 (Jun. 25, 1990).
N. Tanahashi, et al., *Macromolecules*, vol. 24, pp. 5732–5733 (Sep. 30, 1991).
S. Asano, et al., *Macromolecules*, vol. 18, pp. 2057–2061 (Oct., 1985).
Z. Jedlinski, et al., *Macromolecules*, vol. 18, pp. 2679–2683 (Dec., 1985).
N. C. Billingham, et al., *J. Organomet. Chem.*, vol. 341, pp. 83–93 (Mar. 1, 1988).
H. R. Kricholdorf, et al., *Macromolecules*, vol. 21, pp. 286–293 (Feb., 1988).
J. E. Kemnitzer, et al., *Macromolecules*, vol. 25, pp. 5927–5934 (Oct. 26, 1992).
J. Otera, et al., *Nippon Kagakukaishi*, No. 6, pp. 601–610 (Jun. 10, 1990).
J. Otera, et al., *J. Org. Chem.*, vol. 56, pp. 5307–5311 (Aug. 30, 1991).
Y. Hori, et al., *Macromolecules*, vol. 26, pp. 5533–5534 (Sep. 27, 1993).

Primary Examiner—Melvyn I. Marquis
Assistant Examiner—Shelley A. Dodson
Attorney, Agent, or Firm—Sughrue, Mion, Zinn, Macpeak & Seas

[57] ABSTRACT

A process for producing poly(3-hydroxybutyric acid) comprising ring-opening polymerization of β-butyrolactone is disclosed, wherein the ring-opening polymerization is carried out in the presence of at least one tin compound selected from the group consisting of a distannoxane derivative (e.g., 1-chloro-3-ethoxy-1,1,3,3-tetrabutyldistannoxane), a tin carboxylate compound (e.g., tin dioctanoate), and a di-lower alkyltin oxide (e.g., dibutyltin oxide). Poly(3-hydroxybutyric acid) can be produced in high yield at low cost through simple production steps. The resulting polymer has an increased molecular weight to a degree not heretofore attained.

3 Claims, 1 Drawing Sheet

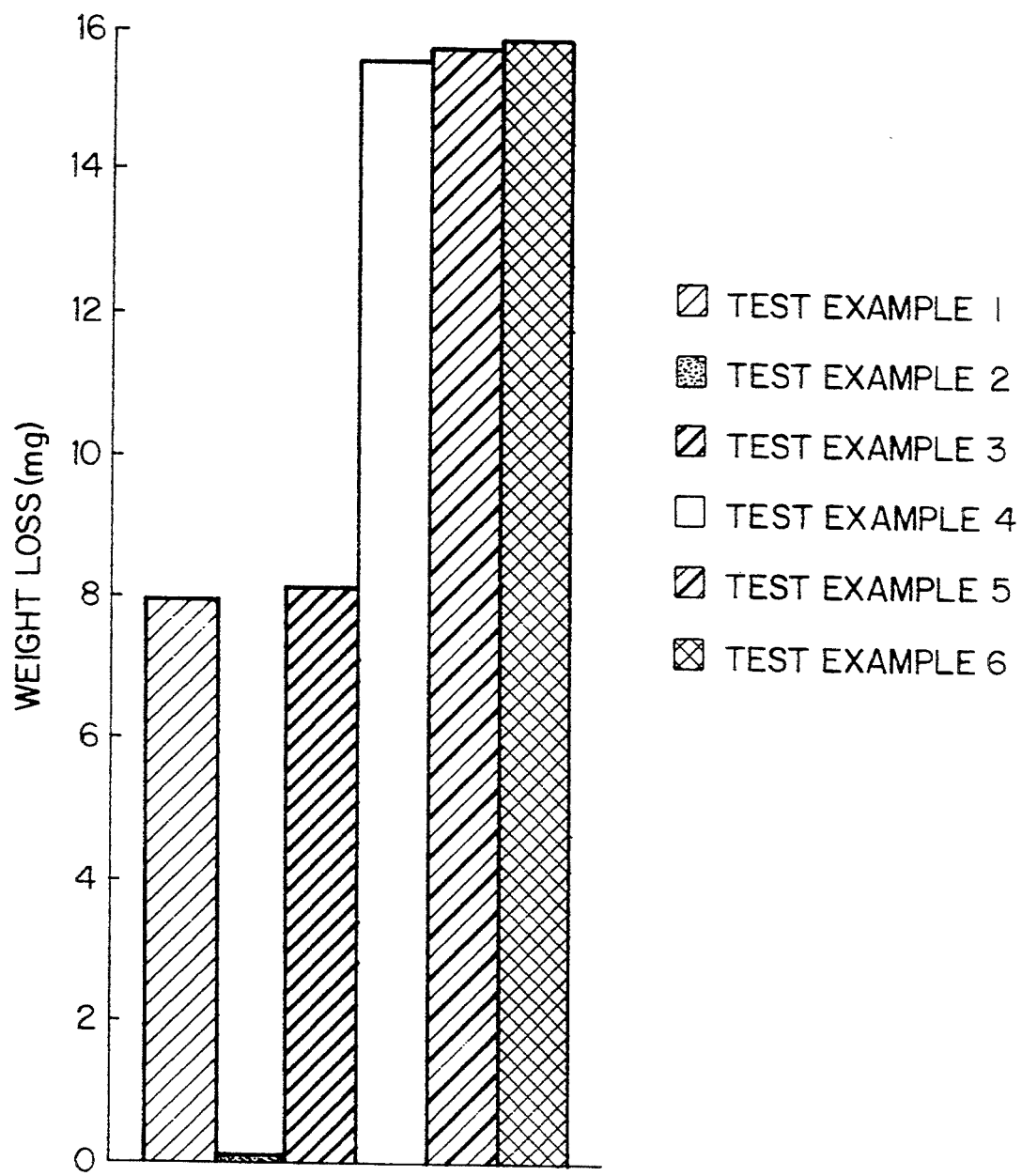

PROCESS FOR PRODUCING POLY(3-HYDROXYBUTYRIC ACID)

FIELD OF THE INVENTION

This invention relates to a process for producing poly(3-hydroxybutyric acid) useful as a functional polymeric material. More particularly, it relates to a process for producing poly(3-hydroxybutyric acid) by ring-opening polymerization of β-butyrolactone in the presence of a specific tin compound in the absence of a polymerization initiator.

BACKGROUND OF THE INVENTION

Many microorganisms which accumulate poly((R)-3-hydroxybutyric acid) in the microbial cells are known (see P. A. Holmes, *Phys. Technol.*, Vol. 16, pp. 32–36 (1985) and Yoshiharu Doi, *SEIBUNKAISEI KOBUNSHI ZAIRYO*, pp. 26–30, Kogyo Chosakai (1990)). This polymer is a thermoplastic resin having biodegradability, i.e., enzymatic decomposability, hydrolyzability, and biocompatibility, and is now attracting attention as a functional polymeric material. For example, it is widely applicable as a clean plastic causing no environmental pollution, taking advantage of its degradability with microorganisms in soil or water (see Yoshiharu Doi, *SEIBUNKAISEI KOBUNSHI ZAIRYO*, pp. 19–26, Kogyo Chosakai (1990)).

Various biological or chemical processes for synthesizing poly(3-hydroxybutyric acid) on an industrial scale have hitherto been proposed. For example, known biological processes include a process of utilizing *Azotobacter vinelandii* as disclosed in JP-A-60-251889 (the term "JP-A" as used herein means an "unexamined published Japanese patent application"). However, biological synthesis of a polymer requires complicated steps for separation of the accumulated polymer from microbial cells, resulting in increased production cost. Besides, there is obtained a polymer having a specific steric configuration at an optical purity of 100%, i.e., an (R)-polymer. Such a polymer has a melting point as high as 180° C. and is therefore difficult to handle as reported in Yoshiharu Doi, ibid, p. 26.

On the other hand, it is known that poly(3-hydroxybutyric acid) is produced by ring-opening polymerization of β-butyrolactone. Examples of this chemical process include a process of using a triethylaluminum/water catalyst system (see Richard A. Gross, et al., *Macromolecules*, Vol. 21, pp. 2657–2668 (1988)), a process of using a diethylzinc/water catalyst system (see Y. Zhang, et al., *Macromolecules*, Vol. 23, pp. 3206–3212 (1990) and N. Tanahashi, et al., *Macromolecules*, Vol. 24, pp. 5732–5733 (1991)), a process of using an aluminum-porphyrin complex as a catalyst (see S. Asano, et al., *Macromolecules*, Vol. 18, pp. 2057–2061 (1985)), a process of using a potassium solution or other potassium compounds as a polymerization initiator (see Z. Jedlinski, et al., *Macromolecules*, Vol. 18, pp. 2679–2683 (1985)), a process of using a specific compound comprising aluminum and zinc ($ZnAl_2O_2(OCHMe_2)_4$) as a polymerization initiator (see N. C. Billingham, et al., *J. Organomet. Chem.*, Vol. 341, pp. 83–93 (1988)), and a process of using a metal alkoxide, e.g., a magnesium or tin alkoxide, as a polymerization initiator (see Hans R. Kricholdorf, et al., *Macromolecules*, Vol. 21, pp. 286–293 (1988)). In the above-mentioned process using a diethylzinc/water catalyst system, β-butyrolactone to be ring-opening polymerized is used after dehydration with calcium hydride.

According to these chemical processes, complicated steps as involved in biological processes are not necessary, and the steric configuration of the produced polymer can be controlled to some extent by a choice of the steric configuration of the starting β-butyrolactone. It is reported that an (R)-polymer produced undergoes biodegradation, while an (S)-polymer produced does not, so that the rate of decomposition can be controlled by the production ratio of the (R)-polymer (see Jhon E. Kemnitzer, et al., *Macromolecules*, Vol. 25, pp. 5927–5934 (1992)). In other words, chemical processes are expected to provide a polymer having an arbitrary optical purity according to use.

However, the conventional ring-opening polymerization of β-butyrolactone encounters difficulty in providing poly(3-hydroxybutyric acid) having a high molecular weight, i.e., a number average molecular weight (Mn) of not less than 100,000 and a degree of polymerization of not less than about 1,000, as achieved by the biological processes. In addition, the catalysts or catalyst systems proposed to date exhibit unsatisfactory catalytic activity, still incurring high production cost.

In some detail, the above-mentioned process using a diethylzinc/water catalyst system produces a polymer having an Mn as low as 50,000 in a yield of about 84% at the highest through a reaction at 60° C. for 5 days (see N. Tanahashi, et al., *Macromolecules*, Vol. 24, pp. 5732–5733 (1991)).

A 1, 3-disubstituted-1, 1, 3, 3-tetraalkyldistannoxane (hereinafter referred to as a distannoxane derivative), one of the tin compounds according to the present invention, has a unique ladder-like double structure and is known to be useful as a catalyst mainly for urethane synthesis or ester synthesis (see Junzo Otera, et al., *NIPPON KAGAKUKAISHI*, No. 6, pp. 601–610 (1990) and J. Otera, et al., *J. Org. Chem.*, Vol. 56, pp. 5307–5311 (1991)).

A process for producing a lactone polymer comprising reacting a lactone with a compound having a hydroxyl group or an amino group in the presence of a distannoxane derivative is disclosed in JP-B-43-2947 (the term "JP-B" as used herein means an "examined Japanese patent publication"). The lactone used in this process has a 6- or higher-membered ring, and no mention is made of ring-opening polymerization of a 4-membered lactone which is deemed to be more difficult to be ring-opening polymerized than 6- or higher-membered lactones. Besides, all the polymers obtained have as low a molecular weight as 500 to 12000 (corresponding to a polymerization degree of about 5 to 140). Further, the process essentially needs a polymerization initiator, failing to meet the demands for simplification of production steps and reduction of production cost.

JP-B-46-645 (corresponding to U.S. Pat. No. 4,071,507) teaches a process for polymerizing a lactone monomer in the presence of a specific polymerization initiator and a catalyst, such as tetrabutyldichlorodistannoxate. However, no specific mention being made of β-butyrolactone, the starting material used in the present invention, it is not construed that the outstanding problems have been settled sufficiently. Further, this patent publication says that a polymer having an average molecular weight of not less than 10,000 and, in some cases, 100,000 or even more can be obtained. However, the working examples of this patent publication simply describe the viscosity of the resulting lactone polymers without specifying the molecular weight, also failing to solve the problem. Furthermore, a specific polymerization initiator, such as glycol diacetate, is still required. Use of such a polymerization initiator not only conflicts with the demands for simplification of steps and reduction of cost but causes a reduction in degree of polymerization because the initiator acts as a catalyst poison in the polymerization system.

SUMMARY OF THE INVENTION

An object of the present invention is to provide a process for producing poly(3-hydroxybutyric acid) useful as a functional polymeric material with industrial advantages, that is, through simplified steps and in high yield.

Another object of the present invention is to provide a process for producing poly(3-hydroxybutyric acid) having an increased molecular weight to a degree not heretofore attained.

As a result of extensive investigations, the present inventors have found that poly(3-hydroxybutyric acid) having a high molecular weight can be obtained without using a polymerization initiator by using a specific tin compound as a catalyst, and preferably by starting with β-butyrolactone having been subjected to a specific treatment.

The present invention relates to a process for producing poly(3-hydroxybutyric acid) comprising ring-opening polymerization of β-butyrolactone in the presence of at least one tin compound selected from the group consisting of a distannoxane derivative, a tin carboxylate compound, and a di-lower alkyltin oxide.

In a preferred embodiment of the process, β-butyrolactone is previously treated so as to remove an existing acid and then subjected to dehydration before being subjected to ring-opening polymerization.

The polymer obtained by the process preferably has a degree of polymerization of from 500 to 10,000.

BRIEF DESCRIPTION OF THE ACCOMPANYING DRAWING

FIG. 1 is a graph showing the weight loss (mg) of the poly(3-hydroxybutyric acid) in a 4 weeks' degradation test.

DETAILED DESCRIPTION OF THE INVENTION

The β-butyrolactone which is a starting compound of the present invention may be any of a racemate, an (R)-isomer, and an (S)-isomer depending on the use of the polymer produced. That is, (RS)-β-butyrolactone is used for production of poly((RS)-3-hydroxybutyric acid), (R)-β-butyrolactone for poly((R)-3-hydroxybutyric acid), and (S)-β-butyrolactone for poly((S)-3-hydroxybutyric acid), respectively. According to the process of the present invention, since the optical purity of the starting β-butyrolactone is retained in the resulting poly(3-hydroxybutyric acid), the optical purity of the starting compound is arbitrarily selected according to the use of the resulting polymer.

(RS)-β-butyrolactone to be used as a starting compound may be a commercially available product or may be prepared by known processes, such as reaction between ketene and acetaldehyde. Optically active β-butyrolactone is prepared by known processes. For ease of obtaining a desired optically active compound, the process of T. Ohta, et al. described in *J. Chem. Soc., Chem. Commun.*, pp. 1725–1726 (1992) or Japanese Patent Application No. 4-210683 is particularly preferred, in which 4-methylene-2-oxetanone is asymmetrically hydrogenated using a ruthenium-optically active phosphine complex as a catalyst, preferably in the presence of a tertiary amine.

It is preferable that acid present in the β-butyrolactone should be removed and, after drying, the acid-free β-butyrolactone is distilled in the presence of calcium hydride before being subjected to ring-opening polymerization.

Specifically, an adequate amount of a solvent, preferably diethyl ether in an amount about three times the volume of β-butyrolactone, is added to β-butyrolactone, and a base, such as sodium hydrogencarbonate or sodium carbonate, is then added thereto to form a salt with a trace of an acid present in the β-butyrolactone, which is then removed. The resulting ether layer is dried overnight over a desiccant, such as magnesium sulfate or sodium sulfate. The desiccant is removed by filtration, and to the filtrate is added calcium hydride, followed by stirring at least overnight, and preferably for 48 hours, for sufficient drying. The resulting solution is distilled in the presence of calcium hydride in an inert gas atmosphere. Distillation is preferably conducted twice. The thus purified β-butyrolactone is preserved in an inert gas till use. By using the thus treated β-butyrolactone as a starting material, the polymerization reaction smoothly proceeds to reach a high degree of polymerization. With untreated β-butyrolactone, the polymerization reaction tends to show slow progress or only to produce a polymer of low degree of polymerization.

In carrying out the process of the present invention, β-butyrolactone is charged in a reaction vessel in an inert gas atmosphere, e.g., nitrogen or argon, and a tin compound is added thereto as a catalyst. The reaction is effected with or without a solvent under normal pressure at a temperature of from 60° to 120° C., and preferably from 80° to 100° C., for a period of from 1 hour to 3 days, and preferably from 2 hours to 24 hours. Any solvent may be employed as long as it is inert to the ring-opening polymerization reaction of the β-butyrolactone. Toluene, tetrahydrofuran, etc., may be mentioned as examples of usable solvents, but the reaction proceeds faster in the absence of a solvent and this is preferred. As described above, addition of a polymerization initiator is not needed.

The catalyst which can be used in the present invention is a tin compound selected from (1) a distannoxane derivative represented by formula (I):

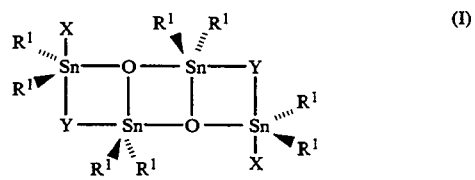

wherein R¹ represents a lower alkyl group or a phenyl group; X represents a halogen atom or —NCS; and Y represents a halogen atom, a hydroxyl group, a lower alkoxy group, a phenoxy group or —NCS, (2) a tin carboxylate compound, and (3) a di-lower alkyltin oxide. These tin compounds may be used either individually or, if desired, in combination of two or more thereof.

In formula (I), the lower alkyl group as represented by $R^1$ includes a straight chain or branched alkyl group containing from 1 to 4 carbon atoms. Similarly, the terminology "lower" as used in "lower alkoxy group" means a straight or branched chain composed of 1 to 4 carbon atoms. The halogen atom as represented by X or Y preferably includes a chlorine atom and a bromine atom.

Specific examples of the distannoxane derivative represented by formula (I) are 1,3-dichloro-1,1,3,3-tetrabutyldistannoxane (the positions of the four alkyl groups or four phenyl groups will hereinafter be omitted as in 1,3-dichlorotetrabutyldistannoxane), 1,3-dichlorotetraphenyldistannoxane, 1,3-dibromotetrabutyldistannoxane, 1-chloro-3-hydroxytetrabutyldistannoxane, 1-bromo-3-hydroxytetrabutyldistannoxane, 1-chloro-3-ethoxytetrabutyldistannoxane, 1-chloro-3-phenoxytetrabutyldistannoxane, 1-bromo-3-phenoxytetrabutyldistannoxane, 1-chloro-3-isothiocyanatotetrabutyldistannoxane, 1-hydroxy-3-isothiocyanatotetrabutyldistannoxane, 1-isothiocyanato-3-methoxytetrabutyldistannoxane, 1-isothiocyanato-3-phenoxytetrabutyldistannoxane, 1,3-diisothiocyanatotetrabutyldistannoxane, and 1,3-diisothiocyanatotetramethyldistannoxane.

These distannoxane derivatives can be synthesized in accordance with known processes. For example, 1,3-dichlorotetrabutyldistannoxane is obtained by adding pyridine to an ethanol solution of dibutyltin dichloride and adding water dropwise to the solution. For the details, refer to R. Okawara, et al., *J. Organomet. Chem.*, Vol. 1, pp. 81–88 (1963). 1-Hydroxy-3-isothiocyanatotetrabutyldistannoxane can easily be synthesized by reacting dibutyltin oxide and dibutyltin diisothiocyanate in ethanol (refer to J. Otera, et al., *J. Org. Chem.*, Vol. 56, pp. 5307–5311 (1991)).

The tin carboxylate compound includes tin dicarboxylates, such as tin diacetate and tin dioctanoate, and dibutyltin dicarboxylates, such as dibutyltin diacetate, dibutyltin dioctanoate, and dibutyltin dilaurate.

The di-lower alkyltin oxide preferably includes dibutyltin oxide.

These tin carboxylate compounds and di-lower alkyltin oxides are commercially available.

The amount of the catalyst to be used generally ranges from 1/40,000 to 1/100 mol, and preferably from 1/20,000 to 1/1,000 mol, per mol of β-butyrolactone, while varying depending on the kind of the catalyst and other reaction conditions. It is possible to vary the degree of polymerization of the resulting poly(3-hydroxybutyric acid) between about 500 and 10,000 by adjusting the amount of the catalyst.

After completion of the ring-opening polymerization, if desired, the product may be purified by dissolving in an appropriate solvent, e.g., chloroform, and pouring the solution into an appropriate solvent, e.g., an alcohol, an ether or a hydrocarbon, for re-precipitation.

The present invention will now be illustrated in greater detail with reference to Reference Example, Examples, and Test Examples, but it should be understood that the present invention is not deemed to be limited thereto.

In analysis of the products obtained, the following instruments were used.

$^1$H-NMR Spectrum: AM-400 (400 MHz), manufactured by Bruker, Inc.

Molecular Weight: D-2520 GPC Integrator, manufactured by Hitachi, Ltd.

Optical Rotation: DIP-360 (digital polarimeter), manufactured by JASCO Inc.

Differential Thermal Analysis: DSC 50 (differential scanning calorimeter), manufactured by Shimadzu Corporation.

Thermogravimetry: TGA 50, manufactured by Shimadzu Corporation.

Biodegradability of the polymers obtained was tested by using active sludge purchased at the foundation KAGAKUHIN KENSA KYOKAI in accordance with the test method "Test of Degradability of Chemical Substance with Microorganism, etc." specified in "Test Methods on Novel Chemical Substances" (Japanese Ministry of Health and Welfare, Notification No. 49-Kikyoku No. 392, Pharmaceutical Affairs Bureau, 13 Jul. and the test method described in Y. Doi, A. Segawa and M. Kunioka, Int. *J. Biol. Macromol.*, Vol. 12, p. 106 (April, 1990).

REFERENCE EXAMPLE 1

Synthesis of (R)-β-Butyrolactone (hereinafter abbreviated as (R)-βBL)

In a 100 ml stainless steel autoclave was charged 17.1 mg (0.01 mmol) of $Ru_2Cl_4((-)\text{-Tol-BINAP})_2N(CH_2CH_3)_3$, wherein Tol-BINAP represents 2,2'-bis(di-p-tolylphosphino)-1,1'-binaphthyl, and 10 ml of tetrahydrofuran was added thereto to prepare a solution. To the solution was added 2.42 mg (0.02 mmol) of dimethylaniline, and the mixture was stirred at 50° C. for 20 minutes. Then, 1.7 g (20.0 mmol) of 4-methylene-2-oxetanone was added thereto, followed by stirring under a hydrogen pressure of 100 kg/cm² at 60° C. for hours. The resulting reaction mixture was distilled in a Claisen flask to collect a fraction having a boiling point of 71°–73° C./29 mmHg, which weighed 1.64 g (yield: 95.0%).

The optical purity of the product was determined by converting the product to a methoxytrifluoromethylphenylacetic acid ester after solvolysis in methanol (methanolysis) and after analyzing the ester by $^1$H-NMR. From the measured diastereomer ratio, the optical purity of (R)-βBL was found to be 91% e.e.

To an adequate aliquot of the resulting (R)-βBL was added three times the volume of diethyl ether, and an adequate amount of a 1N sodium hydrogencarbonate aqueous solution was further added thereto for liquid-liquid separation. The ether layer separated was dried over magnesium sulfate overnight, followed by filtration. Calcium hydride was added to the filtrate. After stirring for 48 hours, the mixture was subjected to precise distillation in an argon atmosphere while recovering the distillate in a reservoir containing calcium hydride. The distillate was again subjected to precise distillation. The thus purified (R)-βBL was preserved in a container packed with argon for use in the following Examples.

EXAMPLE 1

Synthesis of Poly((R)-3-hydroxybutyric acid) (hereinafter abbreviated as (R)-PHB)

In a 20 ml reaction vessel, 3.44 g (40.0 mmol) of (R)-βBL prepared in Reference Example 1 and 0.0056 g (0.005 mmol) of 1-chloro-3-ethoxytetrabutyldistannoxane were stirred at 100° C. for 4 hours in an argon atmosphere.

The product was dissolved in chloroform, and the solution was poured into a 1:10:10 (by volume) mixture of methanol, diethyl ether, and hexane for re-precipitation to obtain 3.42 g (99.0%) of (R)-PHB.

$^1$H-NMR (CDCl$_3$) δ ppm: 1.26–1.29 (3H, m), 2.42–2.50 (1H, m), 2.56–2.66 (1H, m), 5.20–5.31 (1H, m)

EXAMPLE 2

In the same manner as in Example 1, except for doubling the amount of the 1-chloro-3-ethoxytetrabutyldistannoxane, to obtain 3.25 g (94.5%) of (R)-PHB.

EXAMPLE 3

In the same manner as in Example 1, except for replacing the 1-chloro-3-ethoxytetrabutyldistannoxane with 0.0107 g (0.01 mmol) of 1-chloro-3-hydroxytetrabutyldistannoxane, to obtain 3.39 g (98.5%) of (R)-PHB.

EXAMPLE 4

In the same manner as in Example 1, except for replacing the 1-chloro-3-ethoxytetrabutyldistannoxane with 0.0111 g (0.01 mmol) of 1-hydroxy-3-isothiocyanatotetrabutyldistannoxane, to obtain 3.23 g (93.9%) of (R)-PHB.

EXAMPLE 5

In the same manner as in Example 1, except for replacing the 1-chloro-3-ethoxytetrabutyldistannoxane with 0.0100 g (0.04 mmol) of dibutyltin oxide, to obtain 3.00 g (87.2%) of (R)-PHB.

EXAMPLE 6

In the same manner as in Example 1, except for replacing the 1-chloro-3-ethoxytetrabutyldistannoxane with 0.0149 g (0.04 mmol) of tin dioctanoate, to obtain 3.00 g (87.2%) of (R)-PHB.

EXAMPLE 7

Synthesis of Poly((RS)-3-hydroxybutyric acid) (hereinafter abbreviated as PHB)

In a 80 ml reaction vessel were charged 6.89 g (80.0 mmol) of (RS)-β-butyrolacton (hereinafter abbreviated as βBL) (produced by Aldrich Co.) having been purified in the same manner as in Reference Example 1, 6.0 ml of toluene, and 0.0056 g (0.005 mmol) of 1-chloro-3-ethoxytetrabutyldistannoxane, and the mixture was stirred at 100° C. for 16 hours in an argon atmosphere.

The product was dissolved in chloroform, and the solution was poured into a 1:10:10 (by volume) mixture of methanol, diethyl ether, and hexane for re-precipitation to obtain 6.82 g (99.0%) of PHB.

EXAMPLE 8

In the same manner as in Example 7, except for replacing the 1-chloro-3-ethoxytetrabutyldistannoxane with 0.0107 g (0.01 mmol) of 1-chloro-3-hydroxytetrabutyldistannoxane, to obtain 6.55 g (95.1%) of PHB.

EXAMPLE 9

In the same manner as in Example 7, except for replacing the 1-chloro-3-ethoxytetrabutyldistannoxane with 0.0222 g (0.02 mmol) of 1-hydroxy-3-isothiocyanatotetrabutyldistannoxane, to obtain 6.88 g (99.9%) of PHB.

EXAMPLE 10

In the same manner as in Example 7, except for replacing the 1-chloro-3-ethoxytetrabutyldistannoxane with 0.0111 g (0.01 mmol) of 1,3-dichlorotetrabutyldistannoxane, to obtain 6.41 g (93.0%) of PHB.

EXAMPLE 11

In the same manner as in Example 7, except for replacing the 1-chloro-3-ethoxytetrabutyldistannoxane with 0.0100 g (0.04 mmol) of dibutyltin oxide, to obtain 6.49 g (94.2%) of PHB.

EXAMPLE 12

Synthesis of 90% (R)-PHB by Ring-opening Polymerization of (R)-βBL and βBL

In the same manner as in Example 1, except for using 2.99 g (34.7 mmol) of (R)-βBL and 0.45 g (5.2 mmol) of βBL as a starting material and 0.0112 g (0.01 mmol) of 1-chloro-3-ethoxytetrabutyldistannoxane as a catalyst, to obtain 3.32 g (96.5%) of the titled polymer.

EXAMPLE 13

Synthesis of 85% (R)-PHB

In the same manner as in Example 1, except for using 2.62 g (30.4 mmol) of (R)-βBL, 0.82 g (9.5 mmol) of βBL, and 0.0112 g (0.01 mmol) of 1-chloro-3-ethoxytetrabutyldistannoxane as a catalyst, to obtain 3.22 g (93.6%) of the titled polymer.

EXAMPLE 14

Synthesis of 80% (R)-PHB

In the same manner as in Example 1, except for using 2.24 g (26.0 mmol) of (R)-βBL, 1.20 g (13.9 mmol) of βBL, and 0.0112 g (0.01 mmol) of 1-chloro-3-ethoxytetrabutyldistannoxane as a catalyst, to obtain 3.23 g (93.9%) of the titled polymer.

EXAMPLE 15

Synthesis of 70% (R)-PHB

In the same manner as in Example 1, except for using 1.50 g (17.4 mmol) of (R)-βBL, 1.94 g (22.5 mmol) of βBL, and 0.0112 g (0.01 mmol) of 1-chloro-3-ethoxytetrabutyldistannoxane as a catalyst, to obtain 3.10 g (90.1%) of the titled polymer.

Comparative Example 1

Polymerization of (R)-βBL using Polymerization Initiator (R)-βBL (3.44 g, 40.0 mmol) was polymerized in the presence of 0.0056 g (0.005 mmol) of 1-chloro-3-ethoxytetrabutyldistannoxane as a catalyst and 0.21 g (2.35 mmol) of 1,4-butanediol as a polymerization initiator at 100° C. for 15 hours. There was obtained no (R)-PHB but 0.39 g of a hexane-insoluble oily substance (Mn: 326; Mw: 350).

Comparative Example 2

Polymerization of βBL using Polymerization Initiator

βBL (3.44 g, 40.0 mmol) was polymerized in the presence of 0.0056 g (0,005 mmol) of 1-chloro-3-ethoxytetrabutyldistannoxane as a catalyst and 0.21 g (2.35 mmol) of 1,4-butanediol as a polymerization initiator at 170° C. for 1.5 hours. No PHB was produced, and 80% of the βBL decomposed into propylene and carbon dioxide to produce 0.97 g of a hexane-insoluble oily substance (Mn: 366; Mw: 451).

Comparative Example 3

Synthesis of Polycaprolactone (hereinafter abbreviated as PCL) from ε-Caprolactone (hereinafter abbreviated as ε-CL) using Polymerization Initiator ε-CL (4.57 g, 40.0 mmol) was polymerized in the presence of 0.0056 g (0,005 mmol) of 1-chloro-3-ethoxytetrabutyldistannoxane as a catalyst and 0.21 g (2.35 mmol) of 1,4-butanediol as a polymerization initiator at 170° C. for 1.5 hours to obtain 4.57 g (93.8%) of the titled polymer as a white waxy substance (Mn: 2900; Mw: 6000).

Comparative Example 4

Synthesis of PHB using Polymerization Initiator

βBL (3.44 g, 40.0 mmol) was polymerized in the presence of 0.0225 g (0.02 mmol) of 1-chloro-3-ethoxytetrabutyldistannoxane as a catalyst and 0.009 g (0,064 mmol) of glycol diacetate as a polymerization initiator at 170° C. for 1 minute to obtain 1.74 g (50.6%) of the titled polymer as a starch syrupy substance.

Comparative Example 5

Synthesis of PHB using Polymerization Initiator

βBL (3.44 g, 40.0 mmol) was polymerized in the presence of 0.0225 g (0.02 mmol) of 1-chloro-3-ethoxytetrabutyldistannoxane as a catalyst and 0.009 g (0,064 mmol) of glycol diacetate as a polymerization initiator at 100° C. for 2 minutes to obtain 1.69 g (49.1%) of the titled polymer as a starch syrupy substance.

Comparative Example 6

Synthesis of PHB using Polymerization Initiator

βBL (3.44 g, 40.0 mmol) was polymerized in the presence of 0.0562 g (0.05 mmol) of 1-chloro-3-ethoxytetrabutyldistannoxane as a catalyst and 0.009 g (0,064 mmol) of glycol diacetate as a polymerization initiator at 170° C. for 1 minute to obtain 1.70 g (49.4%) of the titled polymer as a starch syrupy substance.

Comparative Example 7

Synthesis of PHB using Polymerization Initiator

βBL (3.44 g, 40.0 mmol) was polymerized in the presence of 0.0562 g (0.05 mmol) of 1-chloro-3-ethoxytetrabutyldistannoxane as a catalyst and 0.009 g (0,064 mmol) of glycol diacetate as a polymerization initiator at 100° C. for 10 minutes. There was obtained no PHB but 0,066 g (3.8%) of a hexane-insoluble oily substance (Mn: 1371; Mw: 1817).

Comparative Example 8

Synthesis of PCL using Polymerization Initiator

ε-CL (4.57 g, 40.0 mmol) was polymerized in the presence of 0.0056 g (0,005 mmol) of 1-chloro-3-ethoxytetrabutyldistannoxane as a catalyst and 0.009 g (0,064 mmol) of glycol diacetate as a polymerization initiator at 170° C. for 5 minutes to obtain 4.55 g (99.4%) of the titled polymer (Mn: 145000; Mw: 203000).

The weight-average molecular weight (Mw), number-average molecular weight (Mn), glass transition temperature (Tg), melting point (Tm), decomposition temperature (TG), and optical rotation ($[\alpha]_D^{25}$ (c=1)) of the polymers obtained in Examples 1 to 15 and Comparative Examples 4 to 6 are shown in Tables 1 and 2 below.

TABLE 1

| Example No. | Mw | Mn | Tg (°C.) | Tm (°C.) | TG (°C.) | Optical Rotation (°) |
|---|---|---|---|---|---|---|
| 1 | 397000 | 178000 | 5.7 | 147 | 285 | −1.4 |
| 2 | 255000 | 147000 | 5.9 | 146 | 283 | −1.2 |
| 3 | 230000 | 132000 | 5.4 | 145 | 280 | −1.3 |
| 4 | 172000 | 99000 | 2.8 | 141 | 279 | −1.1 |
| 5 | 193000 | 119000 | 3.0 | 143 | 286 | −1.5 |
| 6 | 210000 | 110000 | 5.4 | 145 | 283 | −1.3 |
| 7 | 841000 | 311000 | 7.1 | 79 | 285 | — |
| 8 | 307000 | 143000 | 6.8 | 66 | 282 | — |
| 9 | 250000 | 120000 | 4.8 | 55 | 272 | — |
| 10 | 703000 | 310000 | 7.0 | 75 | 284 | — |
| 11 | 398000 | 187000 | 6.4 | 67 | 283 | — |
| 12 | 199000 | 111000 | 6.0 | 133 | 285 | −1.2 |
| 13 | 186000 | 112000 | 6.0 | 105 | 277 | −1.1 |
| 14 | 183000 | 108000 | 5.0 | 92 | 284 | −0.9 |
| 15 | 222000 | 133000 | 4.5 | 50 | 280 | −1.0 |

TABLE 2

| Compar. Example No. | Mw | Mn | Tg (°C.) | Tm (°C.) | TG (°C.) | Optical Rotation (°) |
|---|---|---|---|---|---|---|
| 4 | 35900 | 20600 | 2.8 | — | 275 | — |
| 5 | 25300 | 17500 | 2.8 | — | 270 | — |
| 6 | 14800 | 10400 | 2.5 | — | 270 | — |

Test Examples 1 To 6

Biodegradability of Polymers of Examples

Acclimatized sludge (aerobic sludge) supplied from the Hiratsuka Factory of Takasago International Corporation.

A cast film measuring 1 cm × 1 cm × 0.12–0.38 mm (t) was prepared from the polymer obtained in Example 1, 8, 12, 13, 14 or 15 by dissolving the polymer in chloroform, casting the polymer solution in a petri dish, and evaporating the solvent.

The cast film weighing from 15 to 38 mg and 500 ppm (600 ml) of the sludge having a pH of 6.0 to 7.0 and a temperature of 30° C. were put in a 50 ml flask, and the flask was placed in a shaking thermostatic water tank (manufactured by Titec KK). After 4 weeks, the polymer was weighed to obtain a weight loss (mg) due to biodegradation. The results obtained are shown in Table 3 below and FIG. 1.

TABLE 3

| Test Example No. | Polymer | Weight Loss in 4 Weeks (mg) |
|---|---|---|
| 1 | Example 1 | 8.0 (21%) |
| 2 | Example 8 | 0.1 (0.6%) |
| 3 | Example 12 | 8.2 (37%) |
| 4 | Example 13 | 15.6 (89%) |
| 5 | Example 14 | 15.8 (73%) |
| 6 | Example 15 | 15.9 (50%) |

According to the present invention, poly(3-hydroxybutyric acid) useful as a functional polymeric material can be produced in high yield at low cost through simple production steps. The resulting polymer has an increased molecular weight to a degree not heretofore attained.

While the invention has been described in detail and with reference to specific examples thereof, it will be apparent to one skilled in the art that various changes and modifications can be made therein without departing from the spirit and scope thereof.

What is claimed is:

1. A process for producing poly(3-hydroxybutyric acid) comprising ring-opening polymerization of β-butyrolactone in the presence of at least one tin compound selected from the group consisting of a distannoxane derivative represented by formula (I):

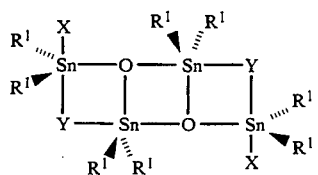

wherein $R^1$ represents a straight chain or branched alkyl group having from 1 to 4 carbon atoms or a phenyl group; X represents a halogen atom or —NCS; and Y represents a halogen atom, a hydroxyl group, a straight chain or branched alkoxy group having from 1 to 4 carbon atoms, a phenoxy group or —NCS, a tin carboxylate compound, and a di-lower alkyltin oxide.

2. A process as claimed in claim 1, wherein said β-butyrolactone is β-butyrolactone having previously been treated so as to remove an existing acid and then subjected to dehydration.

3. A process as claimed in claim 1, wherein said poly(3-hydroxybutyric acid) has a degree of polymerization of from 500 to 10,000.

* * * * *